(12) United States Patent
Lacewell et al.

(10) Patent No.: US 10,671,840 B2
(45) Date of Patent: Jun. 2, 2020

(54) METHOD AND APPARATUS FOR PERSON RECOGNITION USING CONTINUOUS SELF-LEARNING

(71) Applicant: Intel Corporation, Santa Clara, CA (US)

(72) Inventors: Chaunte W. Lacewell, Hillsboro, OR (US); Ravishankar R. Iyer, Portland, OR (US); Sejun Kim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 15/587,194

(22) Filed: May 4, 2017

(65) Prior Publication Data

US 2018/0322333 A1 Nov. 8, 2018

(51) Int. Cl.
*G06K 9/00* (2006.01)
*G06N 20/00* (2019.01)

(52) U.S. Cl.
CPC ......... *G06K 9/00295* (2013.01); *G06N 20/00* (2019.01)

(58) Field of Classification Search
None
See application file for complete search history.

(56) References Cited

U.S. PATENT DOCUMENTS

| | | |
|---|---|---|
| 8,131,012 B2 | 3/2012 | Eaton et al. |
| 8,855,369 B2 | 10/2014 | Kikkeri et al. |
| 2011/0263946 A1 | 10/2011 | Kaliouby et al. |
| 2014/0130076 A1 | 5/2014 | Moore et al. |
| 2017/0032186 A1* | 2/2017 | Murata .............. G06K 9/00671 |
| 2018/0181797 A1* | 6/2018 | Han ...................... G06K 9/627 |

FOREIGN PATENT DOCUMENTS

WO WO-2015196084 A1 12/2015

OTHER PUBLICATIONS

Huang, Q., Xiong, Y., Lin, D.: Unifying identification and context learning for person recognition. In: Proceedings of the IEEE Conference on Computer Vision and Pattern Recognition. pp. 2217-2225 (2018) (Year: 2018).*
Bertsch, Florian A, et al., "Real-time dynamic visual gesture recognition in human-robot interaction", Cognitive Robotics Group, Department of Computer Science, Humboldt-University Berlin, Germany, (2009), 9 pgs.

(Continued)

*Primary Examiner* — Justin P. Misleh
(74) *Attorney, Agent, or Firm* — Schwegman Lundberg & Woessner, P.A.

(57) ABSTRACT

A system and related method are provided for sensor-based person recognition. The system has a data store including global data of a user, the global data including a globally unique identifier and sensed training data. The system further has a classifier to identify the user at a first time using the global data, augment the global data with first context information of the user captured at the first time, and identify the user at a second time by finding correlations between second context information and the first context information when using the global data fails, the second context information of the user captured at the second time.

25 Claims, 6 Drawing Sheets

(56) References Cited

OTHER PUBLICATIONS

Ibraheem, Noor A, et al., "Vision Based Gesture Recognition Using Neural Networks Approaches: A Review", International Journal of human Computer Interaction (IJHCI) ), vol. (3) : Issue (1) :, (2012), 14 pgs.

Kalal, Zdenek, et al., "Tracking-Learning-Detection", IEEE Transactions on Pattern Analysis and Machine Intelligence, vol. 6, No. 1, (Jan. 2010), 14 pgs.

Mou, Dengpan, et al., "A Self-learning Video-based Face Recognition System", Microelectronics Department, University of Ulm, Ulm, Germany 0-7803-9459-3/06 IEEE, (2006), 2 pgs.

O'Toole, Alice J, et al., "Recognizing people from dynamic and static faces and bodies: Dissecting identity with a fusion approach", Vision Research vol. 51, Issue 1, Jan. 2011, pp. 74-83, (Jan. 2011), 25 pgs.

Wu, Ying, et al., "Self-Supervised Learning for Visual Tracking and Recognition of Human Hand", Beckman Institute University of Illinois at Urbana-Champaign, (2000), 6 pgs.

Zhang, Ning, et al., "Beyond Frontal Faces: Improving Person Recognition Using Multiple Cues", UC Berkeley CVPR, (2015), 10 pgs.

\* cited by examiner

METHOD AND APPARATUS FOR PERSON RECOGNITION USING CONTINUOUS SELF-LEARNING

TECHNICAL FIELD

The present disclosure relates to person recognition using continuous self-learning.

BACKGROUND

Traditionally, person recognition systems operate by establishing a positive identification from facial features. Such systems are part of a class of one-dimensional recognizers that are based on static biometric identification data. Many face-detection-based solutions use offline deep learning techniques to create models from significant amounts of data, for example, available in cloud repositories. When using these models, the accuracy of the recognition is dependent on the quality of the training dataset (e.g., whether the frontal face, foreground, and/or silhouette are visible or have the same illumination or other characteristics) because deficiencies in the training data often reappear when the model is used for recognition.

DETAILED DESCRIPTION

Figure 1:
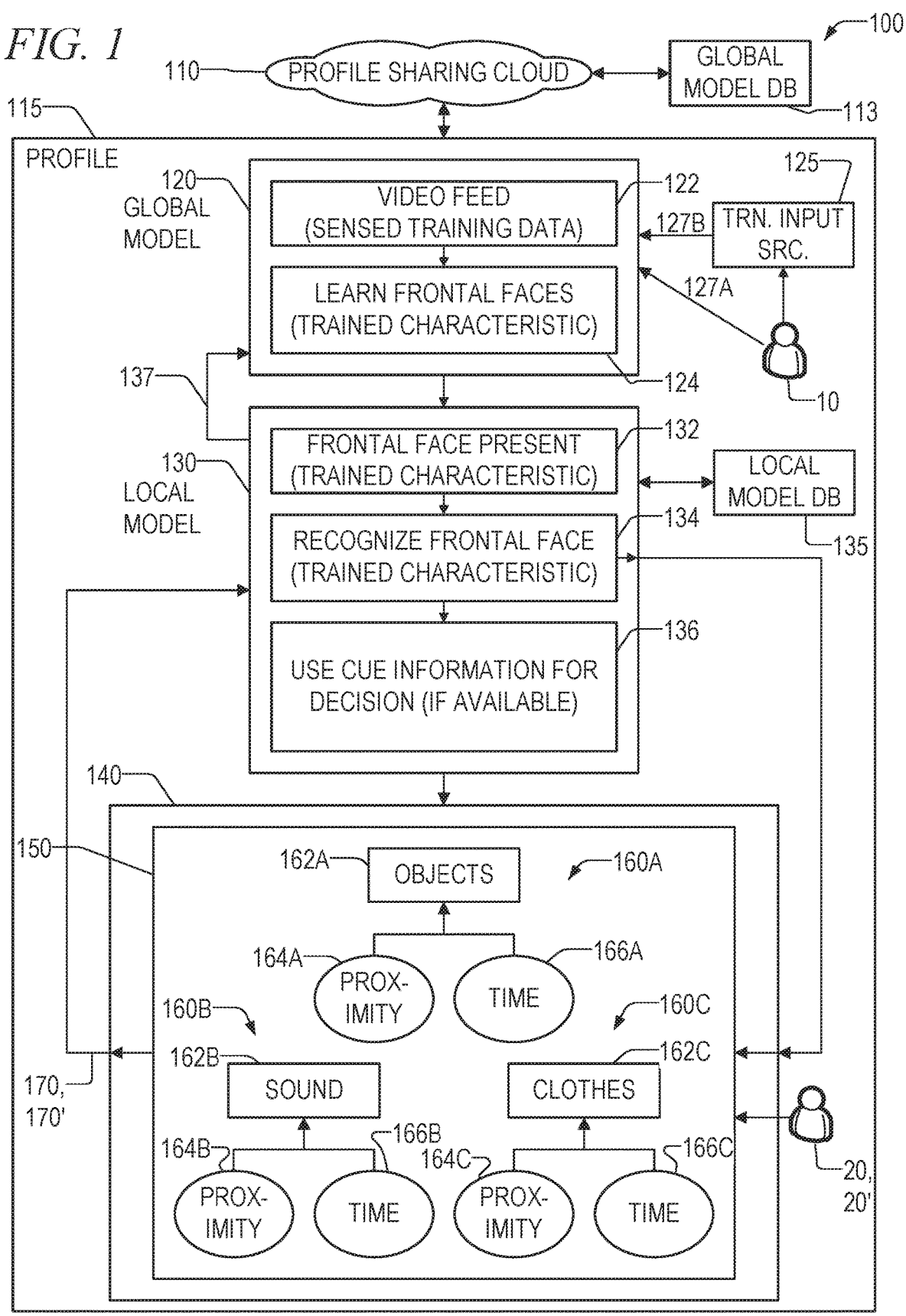
FIG. 1 is a block diagram illustrating components and data flow of the continuous self-learning system, in accordance with the disclosed subject matter.

The following is a detailed description of various configurations depicted in the accompanying drawings. However, the amount of detail offered is not intended to limit anticipated variations of the described configurations; to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

Disclosed herein is a system and method for person recognition using continuous self-learning. Person recognition may involve determining a person under observation as matching a record in a database or as matching a previously observed person, with some degree of certainty. As used herein, "observing" includes visual sensing, as might be done with a camera, but also includes sensing or detecting other elements or characteristics, such as sound, associated devices, and so on. Continuous self-learning includes a capability to learn and evolve in real time under dynamic and diverse environments.

In typical recognition systems, the system is provided with training data associated with a known person. Some characteristics, for example, features associated with a frontal facial view, are collected as training data, and some form of unique identifier (e.g., a social security number) is associated with the training data. Once the training is complete, the system may operate in a recognition mode with respect to the person. In the recognition mode, the person may enter into an engagement zone (a location where recognition is to take place). In the typical system, an image recognition device would capture the frontal facial view, and characteristics associated with the person's face would be compared against those in the database containing the training data. If there is a sufficient degree of correlation, then the person can be considered recognized.

One problem is that if the sensor (e.g., imaging device) is unable to obtain information related to the characteristics that are included in the person's training data, for example, the person only presents a back view to the imaging device, then the traditional systems fail and may simply provide an indication that the person cannot be recognized due to a lack of obtaining training-characteristic-related features in the engagement zone.

Another related problem is that if no training data exists for a person, then a "match" cannot be made. In this case, the traditional systems may be able to indicate with some degree of certainty that the person in the engagement zone is not found in the database containing individuals who have been trained, but then may discard the data collected in the engagement zone.

The systems and methods described herein allow the additional data obtained in the engagement zone to be saved and utilized to improve the recognition system, even when this data cannot be utilized at the time it is collected to recognize the person from training data that has been collected previously. It can do this in at least a couple of different ways. First, when the person is in the engagement zone and can be recognized as one of the people for which training data and a global identifier has been obtained, additional characteristics may be collected and saved as being associated with this person. In a later situation in which the person enters the engagement zone, it may be possible to recognize the person from these additional characteristics, even if the person cannot be recognized based on the originally collected training data.

Furthermore, when the person cannot be recognized when entering into the engagement zone, the data for the person, rather than being discarded, may be maintained locally so that if, at some future time, a relationship can be established between this locally collected data and global training data, the locally collected information can be associated with the global training data and not lost. This can be true even if global training data is never obtained for a person. The system can continue to accumulate information about the person in the engagement zone at different times and still perform "recognitions" of the person with a locally-assigned ID that may still be of value. In this way, the system may constantly improve, even when a failure to recognize a person based on training data occurs.

FIG. 1 is a block diagram illustrating components and data flow of the continuous self-learning system 100, in accordance with the disclosed subject matter. This system 100 may operate utilizing a profile sharing cloud 110 within which a global model database 113 and global model computer reside.

To achieve person recognition using continuous self-learning, in an offline training phase, a global model 120 may be employed to detect and recognize sensed training data 122 originating from a training input source 125 that may receive sensed information from a training person 10 to produce a trained characteristic 124. By way of example, the training input source 125 may be a camera that receives a video feed 122 of a frontal face view of the training person 10. However, the training input sources 125 could also or alternately include audio input devices (e.g., microphones), and other detection devices (e.g., devices to detect the presence of wireless communication devices). Any form of sensor may be utilized as a training input source 125, as discussed below. The training input source 125 produces sensed training data 127B which is associated with a globally unique identifier 127A of the training person 10 (collectively referred to as global data 127). The global data 127 of the training person 10 may be stored in the global model database 113 with the global data of many other training people.

The obtained trained characteristics 124, such as the frontal view of faces, are learned in an initial training mode that may use statically learned mechanisms. A global model (association) database 113 may be built that may then be utilized in real time to allow the person 10 to be recognized by associating detected elements (discussed in more detail below) with patterns associated with the person 10 in real time. Additional data may be collected to help improve a confidence score and to use that data in the future.

Any of the data collected in the system 100 may implement a decay model. A decay model modifies the impact the data has on the global model as a function of time and/or space (e.g., from inside to outside, light changes, etc.) For example, collected information is more valuable (that is, produces recognition with greater certainty) if used closer in time to when it was collected. Different features may have different decay rates. The decay model is discussed in more detail below.

In addition to utilizing trained characteristics 124, such as visual face recognition, the system 100 disclosed herein may continuously learn other cues in addition to the trained characteristics 124 as additional data becomes available over time, particularly during a recognition phase of operation. The system 100 may operate in a recognition phase (broken down as a first recognition phase and a second recognition phase for reasons discussed in more detail below) to enable a person to be recognized in situations outside of an express training situation.

Generally, during the recognition phase, local person 20, 20' enters an engagement zone (FIG. 2) that comprises a self-learning component 140 that is able to learn additional cues by processing cue data 170, which may be a specific type of first context information, produced by learning additional cues 150 with sensing elements and updating the local model 130.

If the local person 20 is able to be recognized as the training person 10 by a local device or computer processing sensed cue data 170 and comparing it with the global data 127, then the sensed cue data 170 may be associated with or added to the global data 127 so that additional characteristics beyond what was provided during the training phase 400A may be used in future recognition phases. In FIG. 1, if a particular trained characteristic, such as the frontal face, is present 132, then if the sensed cue data may be used to retrieve a known (e.g., previously trained) person 10 from the global model database 113, and the sensed cue information 170 may be used to provide additional information 137 for the known person 10.

If the local person 20 cannot be recognized as any training person 10 in the global model database 113, then a temporary local ID may be created to hold the sensed cue data 170 for later possible recognition and association with the training person 10—the sensed cue data 170 may still be used for making a recognition decision 136, however.

By way of example, a local person 20 enters the engagement zone and their face (the trained characteristic 134) is not visible. The system 100 may utilize an additional cue (e.g., wearing a red shirt and holding a brown coffee mug) obtained from earlier sensed cue data 170 to assist in recognizing the person. Thus, the system 100 may incorporate deep learning, which may utilize the sensed training data 127B comprising thousands of samples—but after the initial training phase, a local person 20 may be recognized based on other sensed cue data 170 such as clothing, surrounding objects, sound, and so on, without initially training on those items. In other words, the present system 100 is not fully dependent upon the initial learning. The basic global model data 127 may be learned based on a frontal face view, but if the local person's 20 face is not visible, present, or recognized, in the engagement zone, then the other sensed cue data 170 may be used to recognize the local person 20.

As discussed above, the data (sensed training data 127B or sensed cue data 170) associated with a person 10, 20 may be associated with a decay period, which provides an indication of reliability and may be utilized as a factor in determining a confidence level for recognition. Some data of a relatively permanent nature (e.g., facial features, birthmarks, tattoos) may have very lengthy decay periods, whereas other data of a relatively transient nature (e.g., clothing) may have much shorter decay periods. Lengthy decay periods permit the data to be relied on in determining a confidence level for a longer period of time than shorter ones. The decay period for a particular attribute or data item could be a continuous value or a quantized value (e.g., "long" and "short"), and such values should be configurable and adaptable by the system.

In one configuration, the sensed training data (127B) and sensed cue data 170 with a lengthy decay period may be stored within the global model data 127 or in the global model database 113, whereas sensed cue data 170 with a short decay period may be stored within the local model or the local model database 135—however, this is not essential, and the global model data 127 and local model database 135 may share and synchronize data about a person regardless of the origin.

The system 100 disclosed herein may provide at least one of: a) an ability to recognize a person even when the offline global model data or sensed training data 127 cannot provide enough information to recognize the person; b) an ability to learn additional cues (from sensed cue data 170) from both static data (from relatively unchangeable features, such as furniture placement in a room) and temporal data (from changeable features, such as the local person's 20 clothing) in the local environment and context (or engagement zone); c) an ability to evolve the models (both global 120 and local 130) with small amounts of data at a time, in real-time; and d) building an association from the collected local sensed cue data 170 to enrich the global model 120 and global data 127.

The system 100 may comprise various components. One component is a profile sharing component that may comprise the profile sharing cloud 110 with the global model database 113. The profile 115, although shown as separate from the global model database 113, may reside within this database 113 and may comprise both global data 127 as well as sensed queue data 170 stored in the local model database 135. In the event that a user 10, 20 wants to use multiple devices, this system 100 may transfer the profiles 115 to other devices. For example, a user 20, John, initially uses his notebook computer at work as a local device (FIG. 2) for the person recognition system 100, but also wants to use the person recognition system 100 at home on his desktop computer as a local device. Instead of repeating the training phase 400A (e.g., the learning of his face and local cues on his home system), John may transfer his profile 115 to this home system as a local device.

Another component is a global model component 120. This component may include a copy of the global data 127 in which trained characteristic 124 (e.g., a frontal view of the face) is learned offline. This global model component 120 model may contain a large volume of data, which may include many trained characteristics 124 of different people.

Another component is a local model component 130. This component may reside on the user's local device. It may determine whether the trained characteristic 124, such as the person's face, is present in a current sensed cue data 170 feed (e.g., a video feed) and attempt to recognize the local person 20 if the trained characteristic 124 is present. If the trained characteristic 124 is recognized, that is, one that has been identified either from the global model data 127 or using some other form of identification, the system 100 returns the person's identification 127A, and further uses self-learning to learn additional identification cues/information 170 related to the local person 20. Otherwise, if the trained characteristic 124 cannot be determined, the local model 130 may use the sensed cue data 170 (if available) to recognize the local person 20. If the cue data 170 is unavailable, then the person 20 may remain unknown.

Another component is a self-learning component 140. This component may update local models 130 by sensing local sensed cue data 170 from the surrounding environment in an engagement zone in time and space. The engagement zone, as defined herein, may be a contiguous area or may comprise multiple non-contiguous areas. This sensed cue data 170 may include data sensed attributes of various aspects of the person and/or environment 160A, such as a person's clothing 162C (such as color and/or texture), their voice or ambient sound 162B associated with a high correlation, other body parts, such as hands (if present in view), objects 162A such as jewelry, glasses, or other personal items. This data may include weightings for proximity 164A, 164B, 1645C, time 166A, 166B, 166C, and (not shown) uniqueness. The sensors used in the local model and in the environment in which recognition may take place may include any of the sensors used for training, including imaging devices, audio devices, wireless device detectors, and so on.

The proximity weighting provides a relationship rule indicating that the closer an item is to the local person 20, the more likely it is to be related to that person. Thus, a coffee cup 2" from the person's hand is more likely to be associated with the person than one that is 6' away. The time weighting provides a relationship rule indicating that the closer in time an attribute is to the local person 20, the more likely it is to be related to that person. Thus, a red sweatshirt may be a better predictor for a person five minutes later as opposed to five days later. Finally, the uniqueness weighting provides a relationship rule indicating that the more unique an item is, the more likely it is to be related to that person. Thus, a sweatshirt that identifies a sports team and has a team number on it is more likely to be related to a particular local person 20 than a featureless gray sweatshirt.

The combination of the local model 130 and self-learning 140 incorporates a human ability to use associative learning techniques which may correlate multiple elements in the self-learning service. To improve the associative learning, this solution may apply weights to the identified cues based on time and proximity to determine a confidence level when identifying a person. This is pertinent to person recognition using self-learning because an associated cue could lose its relevance through time and space.

A technical procedure may operate as follows. In the initial offline training phase, the global model may sense trained characteristics 124 as sensed training data 127B, such as regions of interest of the training person 10, such as their face and three regions of their body, (e.g., left and right shoulders, hair, and torso). The hair region, which may be the upper part of the face region, may be stored as static data (e.g., data that does not change over time). The shoulder regions may be stored as temporal data (e.g., data that changes over time—the shoulders changing shape over time as the person moves around). The torso region may include the bottom center of both shoulder regions and may also be stored as temporal data. The sensed training data 127B of all captured regions may be processed through the detection method to gather information of hair color, texture, and color details of upper body clothes. The results may be trained through an online training supervised learning method and associated with the global model 120 with a preset weight that deteriorates by time.

An audio capturing device may be used as a training input source 125 to capture voice samples as sensed training data 127B of the training user 10 or relevant ambient sounds in the training area that could also be stored in the global model 120. The training area could be the same as the engagement zone, and in fact, is preferred to be when collecting local cue data 170 that should align with related sensed training data 127B. For example, if the user 10, 20 will be using the recognition system 100 for logging in to a desktop computer located in their study, then the study could serve as the location for both the training area and the engagement zone.

In the recognition phase(s) (which may be considered classification/prediction stages), when a local person 20 to be identified is present, but the trained characteristic 124 cannot be detected, such as their face cannot be seen, the associated local sensed cue data 170 may be searched by scanning the image, audio, or other sensor input. For example, after a background subtraction preprocessing, the person's hair, shoulder, and torso regions may be calculated by assuming a human body shape. Collectively, the regions may go through the supervised learning classification to find a matching identifier, such as the globally unique identifier 127A for the local person 20, and a confidence score may be determined for the recognition. In the same environment, an attempt may be made to detect any voice or ambient sound as the sensed cue data 170 in the event of detection to also bind it with the globally unique identifier 127A. The system 100 may operate in real-time and use any form of spatial/temporal cues to make the recognition.

The system 100 may be implemented in devices that could include any form of computer (desktop or fixed location computer, portable computer such as smart phones, tablet devices, and laptops, robotics, augmented reality devices, Internet of Things (IoT) devices, wearable devices, etc.).

Figure 2:
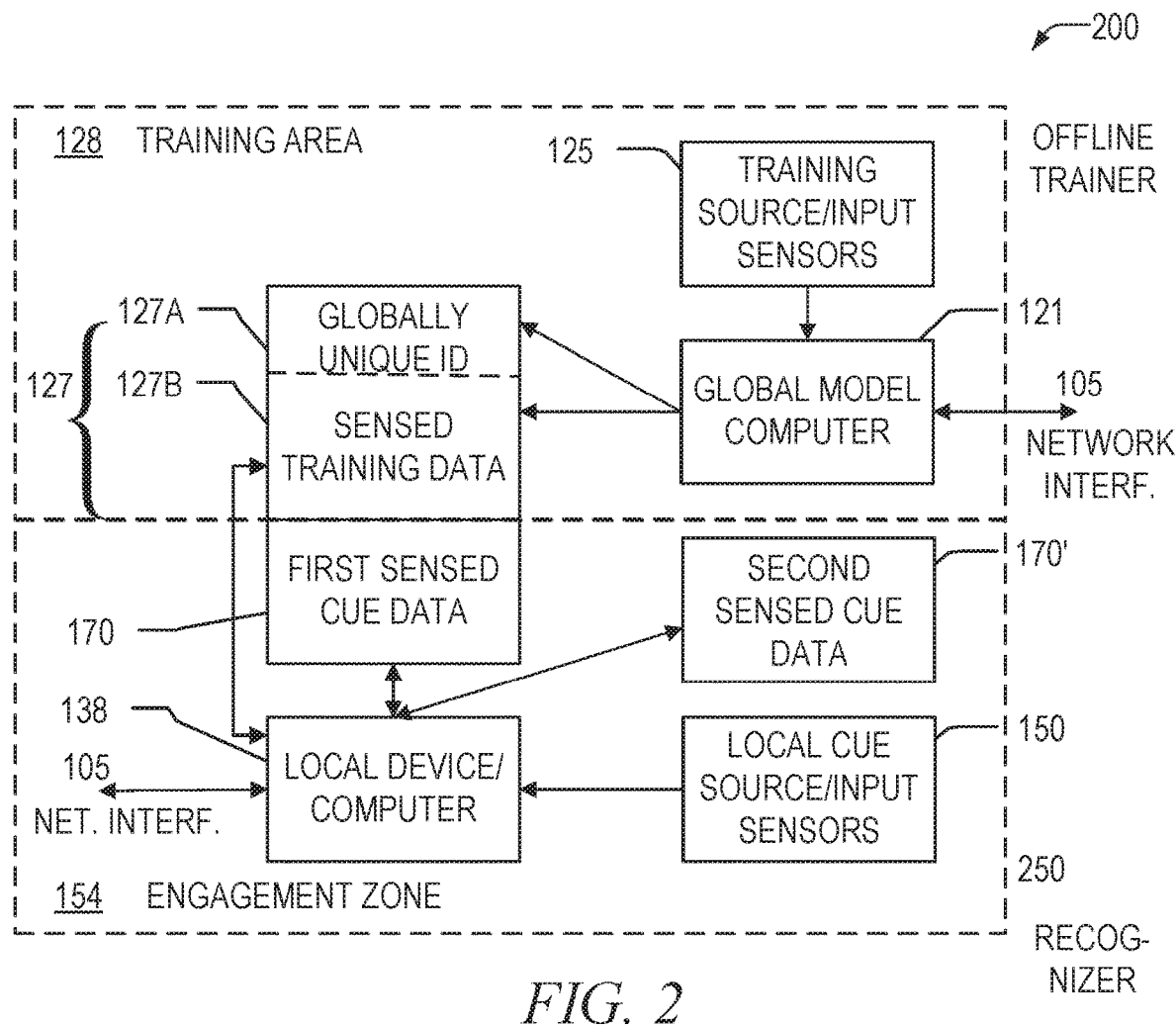
FIG. 2 is a block diagram that illustrates the relationship between the global and local data, in accordance with the disclosed subject matter.

FIG. 2 is a block diagram that illustrates the relationship between the global and local data, in accordance with the disclosed subject matter. The system 100 may be broken down into an offline trainer 200 that is used to train the system with a known training person 10, and a recognizer 250, which may be a type of a classifier, that is used to recognize the person.

In the offline trainer, the global model computer 121, which is an example of the global model computer discussed above, may be responsible for collecting training data from the training sources/input sensors 125 in the training area 128, which is an example of the training area discussed above. This computer 121 may have a network interface so that its collected data may be accessed by other devices and shared. The computer stores the sensed training data 127B along with a globally unique identifier 127A (collectively global data 127) that may be subsequently accessed for performing a recognition process. The global model computer 121 may be the same as a local device/computer 138, or they may be separate devices.

In the recognizer 250, in the engagement zone 154, which is an example of the engagement zone discussed above, the local device 138, which is an example of the local devices discussed above, may be responsible for collecting sensed cue data 170 from local cue sources or input sensors 150. In the subsequent processes that follow, the local device 138 may collect information about the local person 20 at different times. In FIG. 2, the system may store first sensed cue data 170 during the first recognition phase, and may store second sensed cue data 170', which may be a type of second context information, during a second recognition phase. At some point, an overall goal is to associate the first sensed cue data 170 and the second sensed cue data 170' with the global data 127, although there are different mechanisms and processes in place to achieve this ultimate goal. The association may be achieved by replicating all updated information both in the global model database 113 and in the local model database 135, or could be achieved through linkages that map out where all relevant data exists within the system 100.

Figure 3:
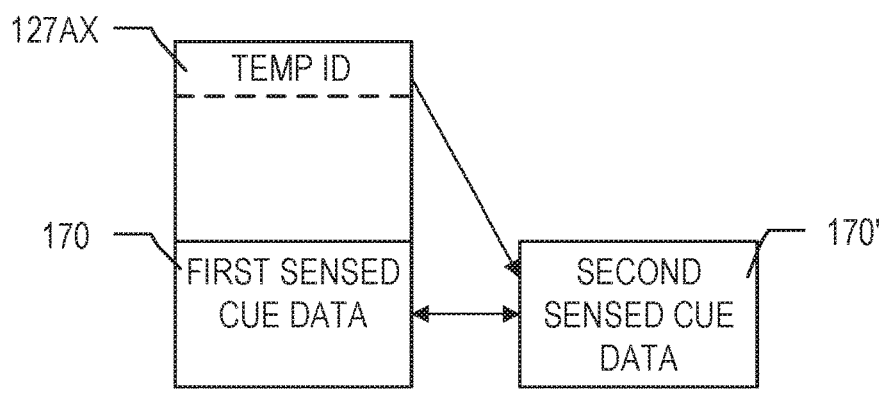
FIG. 3 is a block diagram that illustrates the creation and storing of a temporary locally unique identifier in the local model when global data cannot be located for the local person in the engagement zone, in accordance with the disclosed subject matter.

FIG. 3 is a block diagram that illustrates the creation and storing of a temporary locally unique identifier 127AX, which is an example of a temporary locally unique identifier discussed above, in the local model 130 when global data 127 cannot be located for the local person 20 in the engagement zone 154, in accordance with the disclosed subject matter. During the first recognition phase, the locally unique identifier 127AX and first sensed cue data 170 may be stored in the local model database 135. As noted previously, the ultimate goal is to associate all of the sensed cue data 170 with the global data 127—however, until the sensed cue data 170 may be properly associated with the global data 127, the local copy of the first sensed cue data 170 is associated with the temporary locally unique identifier 127AX, and sensed cue data 170' collected in subsequent recognition phases may continue to be associated with the temporary ID 127AX, if possible.

In the event that data collected in this way cannot be associated with existing global data 127, different actions may be taken. In one implementation, this sensed cue data 170 may simply be discarded after some predetermined period of time. In another implementation, the data may be maintained on the local device 138 in the local model database 135 indefinitely. In a further implementation, the data could be saved in the global model database 113, but possibly flagged or in some other way indicated (possibly through characteristics of the temporary locally unique identifier 127AX) as not benefiting from an offline training phase and not having certain identifying information that would normally be collected in the offline training phase.

Use Cases

The following use cases assume the global model has already learned a person's frontal face offline.

Case #1: Frontal Face not Present

In a first use case, a person becomes visible in a video feed, but their frontal face is not visible because the person is turned away from the camera, is looking down, their face is tilted, or otherwise obscured. The local model assumes a face is not present in this situation. The local model then determines whether additional cue information is available. If so, time and proximity information for each cue may be used to recognize the person visible in video Case #2: Frontal Face Present and Recognized In a second use case, the person becomes visible in video feed and their frontal face is visible. In this case, the person's face may be recognized using the global model. Since the face is recognized, the system may use self-learning to obtain additional information from the surrounding environment in time and space. The information obtained from the cues may then be used to update the local model.

Case #3: Frontal Face Present and Unknown

In a third use case, a person becomes visible in the video feed and their frontal face is visible. The person's face is not recognized using the global model, which may occur for a number of reasons, including: 1) the image quality is poor; 2) the person's face has changed (e.g., beard, sunburn, etc.); and/or 3) the face recognition system may be sub-optimal. If cue information is available, this information may be used to recognize the person. The time information may be used to determine an amount of time that has passed since the cue was associated with the person. If too much time has passed, the confidence level of the respective cue is reduced. For example, if a shirt is associated to John Doe on a particular day, the system might not use that same association hours later because John could have changed his shirt. Or, the confidence level could be lowered to reflect a decay rate of this particular attribute.

Also, in cases where other sensors are incorporated in this system, such as the detection of use of a particular keyboard, small gaps between usages (e.g., the user types, leaves for five minutes, and returns to type) may increase confidence level, while large gaps (a several hour gap between keyboard use) may reduce the confidence level. The proximity information may be used to determine a physical distance of the cue to the person. If the cue is too far from the person in question, the confidence level of the respective cue may be reduced. For example, a particular cup that is six inches from John's hand may have a stronger association with John than a cup that is six feet from John's hand. The time and proximity may be combined in terms of the strength of association. A cup that is located two feet from where John was sitting five minutes ago may be more strongly associated with him than a cup located six inches from where John was sitting three hours ago, depending on how the factors are weighted.

Thus, both the time and proximity confidence levels may be combined to determine an overall confidence of the person recognition. When additional cues are recognized and a sufficient confidence threshold is achieved, it may also be possible to learn other new attributes, such as a new head pose (e.g., a side profile or a back of the head) using this technique. This enables closing the loop and providing potential updates to the global model/classifier as well. If the additional cue information is not available, the face remains unknown.

The following use case presumes that the global model has not learned anything about the person.

Case #4: No Information on Person in Global Model

The person enters a room and has their face become visible in a video feed. Using all of the information available, the system determines that the person is not in the global model. It may then create a new person identifier (storing it, e.g., in a local database) and begin collecting as much information as possible for that new person, which may include any of the features discussed herein (facial, audio, body, etc.). If the person leaves the area, and then returns some time later, the system may still perform a recognition using the new person identifier stored in the local database and, even though it may not have an absolute identification, it may still continue to collect information about that person. The local database may keep the data on the new person, or discard it according to some criteria (such as expiration of a timer, transfer of data to the global database, etc.)

The local model may communicate with the global model. In the present use case, the person having the new person identifier may, at some point in the future, register their information in a training session with the global model. In this case, it may be possible for the local model to detect that the person information entered into the global model corresponds, with some confidence level, to the new person identifier stored in its local database and update its local database accordingly (and additional local data may also be uploaded to the global model).

Figure 4A:
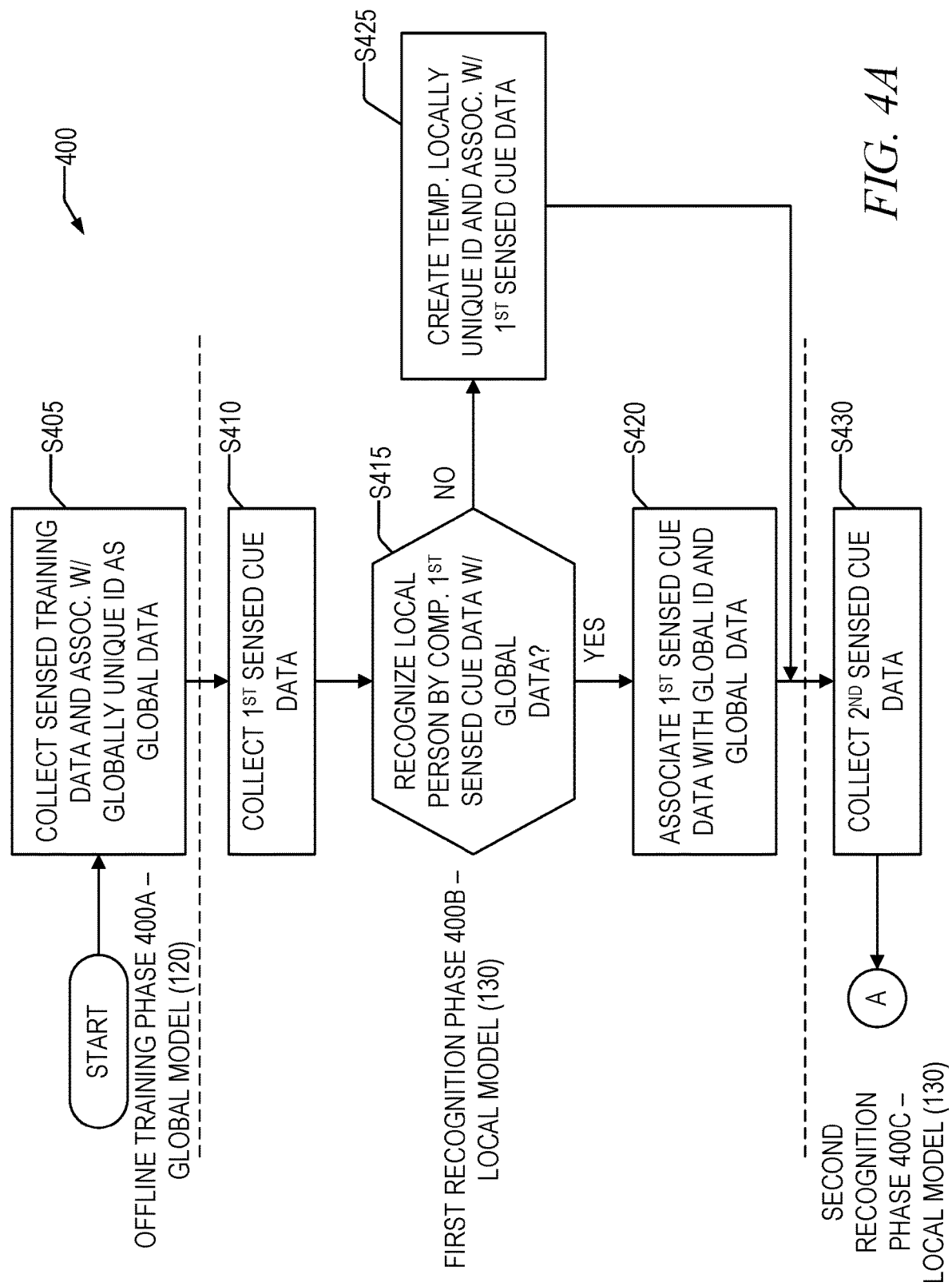
FIGS. 4A and 4B are parts of a flowchart that illustrate functional components that may be utilized in the use cases described above, in accordance with the disclosed subject matter.
Figure 4B:
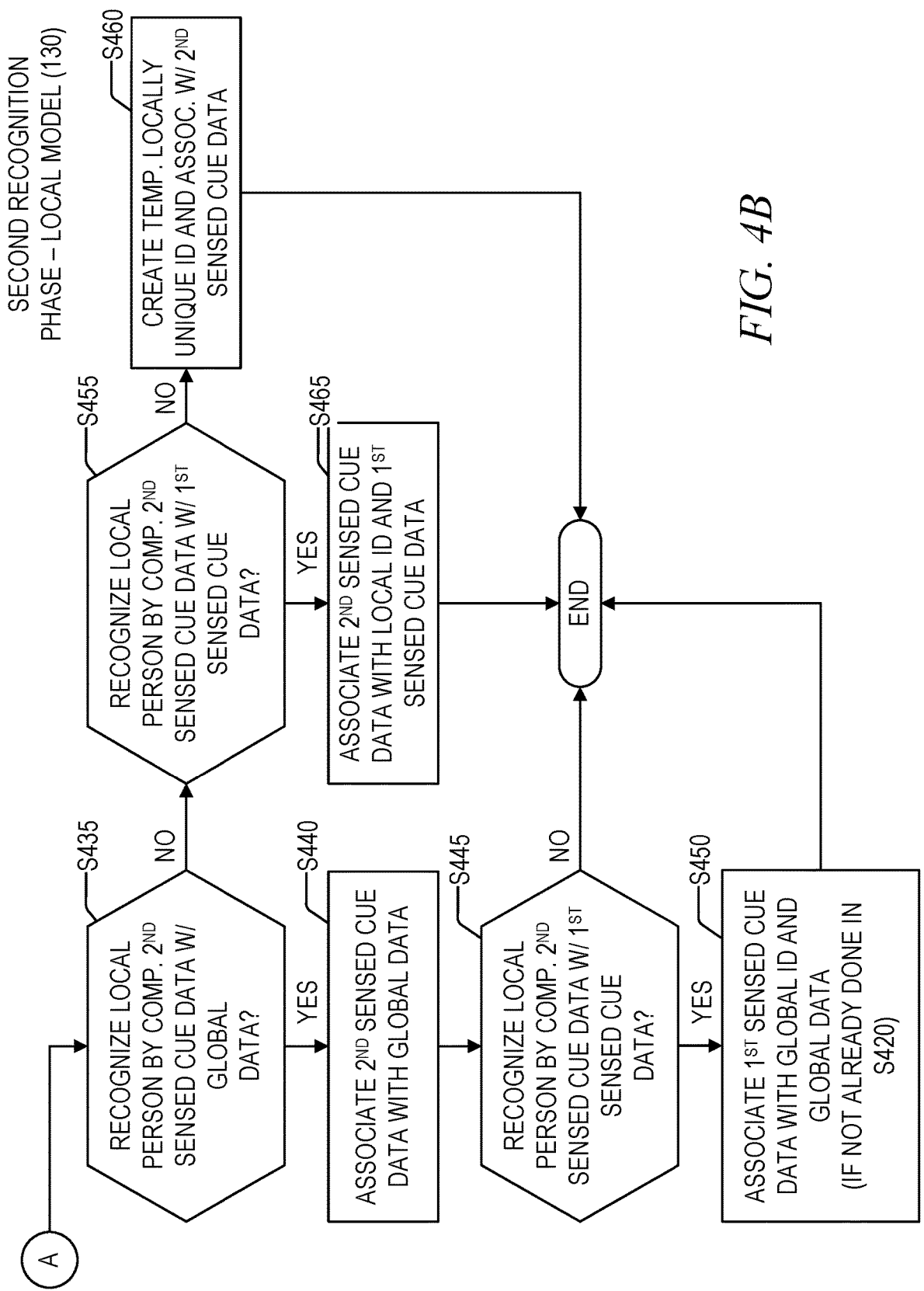

FIGS. 4A and 4B are parts of a flowchart that illustrate functional components that may be utilized in the use cases described above, in accordance with the disclosed subject matter. The flowchart illustrates an offline training phase 400A for the global model 120, a first recognition phase 400B, also referred to herein as a first time, for the local model 130, and a second recognition phase 400C, also referred to herein as a second time, for the local model 130. In practice, there could be any number of recognition phases, and the principles discussed herein could apply to any subsequent phases (e.g., that, in the event the sensed cue data 170 cannot be associated in any particular phase to the global data 127, it is maintained (and accumulated) in the local model database 135 until a future time when it possibly could be).

In FIG. 4A, the process 400 may start with the offline training phase 400A, which may be an example of the offline training phase discussed above, for the global model 120. In operation S405, sensed training data 127B for a training person 10 is collected and associated with a globally unique identifier 127A. By the nature of the training process, there is a high certainty that the sensed training data 127B is properly correlated with the globally unique identifier 127A. This data may be stored in the global model database 113.

Once the training is complete, the system may then begin operating in a recognition mode. In a first recognition phase 400B, which may be an example of the first recognition phase discussed above, in operation S410, the first sensed cue data is collected within the local model 130 and may be stored in the local model database 135. In operation S415, a determination is made as to whether the local person 20 may be one of the training persons 10 in the global model database 113. Such a determination might be made if, for example, the first sensed cue data 170 (so named to indicate it is collected in the first recognition phase 400B) is a frontal face view of the local person 20 captured by a camera, and this data is determined to match the frontal face view of a trained person 10 in the global model database 113.

In this case, (S415: Y) the local person 20 may be identified as being one and the same as the training person 10, and the global data 127 and, in operation S420, first sensed cue data 170 may be associated with one another (using the techniques described above). Thus, for example, if the first sensed cue data 170 provides information of a tattoo on the local person's 20 left lower arm, then this tattoo data may be associated with the global data 127, and this tattoo may be utilized in future recognition phases to make a recognition with a higher confidence level, even though the frontal face view (the original training data) is not a part of the first sensed cue data 170.

If (S415: N) the local person 20 cannot be identified as one of the training persons 10 in the global model database 113, then in operation S425, the temporary locally unique identifier 127AX may be created and this is associated with the first sensed cue data 170 in the local model database 135.

Next, the second recognition phase 400C is discussed, which may be an example of the first recognition phase discussed above. This phase may occur if, for example, the first local person 20 leaves the engagement zone 154 and then later returns. When this occurs, in operation S430, second sensed cue data 170' is collected from the second local person 20' (the prime designation is due to the fact that initially, the second local person 20' is not known to be the first local person 20 from the first recognition phase 400B or the training person 10.

In operation S435, a determination may be made as to whether the second local person 20' may be recognized as the training person 10 stored in the global model database 113 by comparing the second sensed cue data 170' with the global data 127. If there is a match (S435: Y), then, in operation S440, the second sensed cue data 170' may be associated with the global data 127.

Next, a determination may be made, in operation S445, whether the second local person 20' may be recognized as the first local person 20 from the first recognition phase 400B. If so (S445: Y), then in operation S450, the first sensed cue data 170 may be associated with the global data 127 (if not already done in operation S420). This branch of the flowchart is advantageous in that the first sensed cue data 170 may ultimately be associated with the global data 127 by using the second sensed cue data 170' when this association cannot be made by directly comparing the first sensed cue data 170 with the global data 127.

Turning back to operation S435, if (S435: N) the second local person 20' cannot be recognized as the training person 10, then in operation S455 (which is essentially the same as operation S445), a determination is made as to whether the second local person may be recognized as the first local person 20. However, in this case, if so (S455: Y), in operation S465, the second sensed cue data 170' is associated with the local identifier 127AX and the first sensed cue data 170. If not (S455: N), then a new temporary locally unique identifier is created (not shown) and the second sensed cue data 170' is associated with it.

This process may continue into third and subsequent recognition phases, in which associations of locally detected persons are attempted with training persons in the global model database and with previously locally detected persons, and if these associations cannot be made, then a new temporary identifier is assigned to the new person in the engagement zone. In general, the information may be synchronized once associations are made according to some confidence threshold.

This process 400 permits much greater power in expanding the attributes available in the recognition system, particularly by leveraging attributes having a relatively short decay time. For example, a local person's tattoo (a relatively permanent and long decay time feature) may not have been an attribute recognized in the initial training, but captured in the first recognition phase. The first and second recognition phases could link the person together via a particular red shirt (short decay time feature), and other attributes could link the person in the second recognition phase to the training person. The tattoo could thus be added to the global data by way of this linkage, even though it was not directly linkable in the first recognition phase in which it was detected.

Variations

There are variations that may improve this general description of person recognition using self-learning. For example, saved images could be used in place of a continuous video feed. Also, instead of using only the frontal face view, the global model could use background subtraction or other known methods to learn the face. In the event that a yes/no decision is needed regarding recognition, an overall confidence level threshold may be set such that the degree of confidence value in the person must be exceeded before a person is considered recognized. This threshold could vary, depending on the circumstances. For example, an identification of a person at a social gathering may only need a threshold of a 50% confidence level, whereas a computer logon may require a 95% confidence level.

The confidence level may also be affected by a uniqueness attribute. By way of example, if a particular T-shirt that a person is wearing contains printing about a 1992 spring break in Miami Fla., it is unlikely that others would have such a shirt in a particular context, and such a shirt could significantly increase the confidence level for recognition of a person wearing such a shirt. In contrast, if the person is wearing a plain gray T-shirt, such a shirt may only modestly increase the confidence level for recognition of a person wearing such a shirt, since it would not be unusual for others to wear such a shirt. With regard to clothing, a uniqueness attribute could be based on a logo, pattern, number, words-any attribute that may serve to distinguish an article of clothing from another.

In one implementation, such a determination may be made by, for example, if an entire body of the person with the shirt may be captured, it may be determined if that article of clothing ever again appears with a different face. This could help to dynamically delineate between more popular and more unique articles of clothing. In addition, a context for a clothing wearer could be taken into consideration as well. For example, if the global database contains millions of individuals, there may be four such 1992 spring break T-shirts in the database. However, in a given home at a particular address (or even in a particular city—the context scope could be variable), that particular T-shirt could be associated with a particular individual with a very high certainty. In an a priori model, a person could walk through their wardrobe and present their clothes to the system, and such information could be fed to the global model (essentially as training data).

With regard to image data collected by a camera, the system may analyze individual image frames, such as taken with an imaging device in a snapshot mode or video frame stills, and/or consider motion information from video, such as a person's gait, hand gestures, or other mannerisms obtainable from multi-media information. For example, if a person walks with a limp, the system could recognize that fact and utilize the information in establishing a higher confidence level in the recognition. Voice and speech recognition also fall into such a duration based signal that may be analyzed and considered by the system.

As noted above, the global model training and the person detection in the local model may take advantage of any form of sensors-imaging, as discussed above, audio for voice recognition, ambient sound detection, and other sound-related information. At a point in time in which olfactory sensors are able to reliably detect smell, then such inputs could be used as well. Furthermore, sensors in the form of detectors may be utilized, such as a detector to determine a device (e.g., cell phone, lap top, tablet, music player, or any device emitting a detectable signal that may serve as a signature for the device) in the proximity of a person. For wireless network-related devices, a media access control (MAC) address could serve as a uniquely identifying signature for the device, which may correlate strongly with a particular person. In a vehicle, sensors that detect weight, driving characteristics, and so on, could be utilized to assist in the recognition of the person.

The ability to perform pattern matching may be done using known pattern matching techniques, and may be performed in hardware and/or software. Known neural networking technologies may be employed for recognition tasks, such as recognizing the person's face, hair color, speech, and/or sound.

Figure 5:
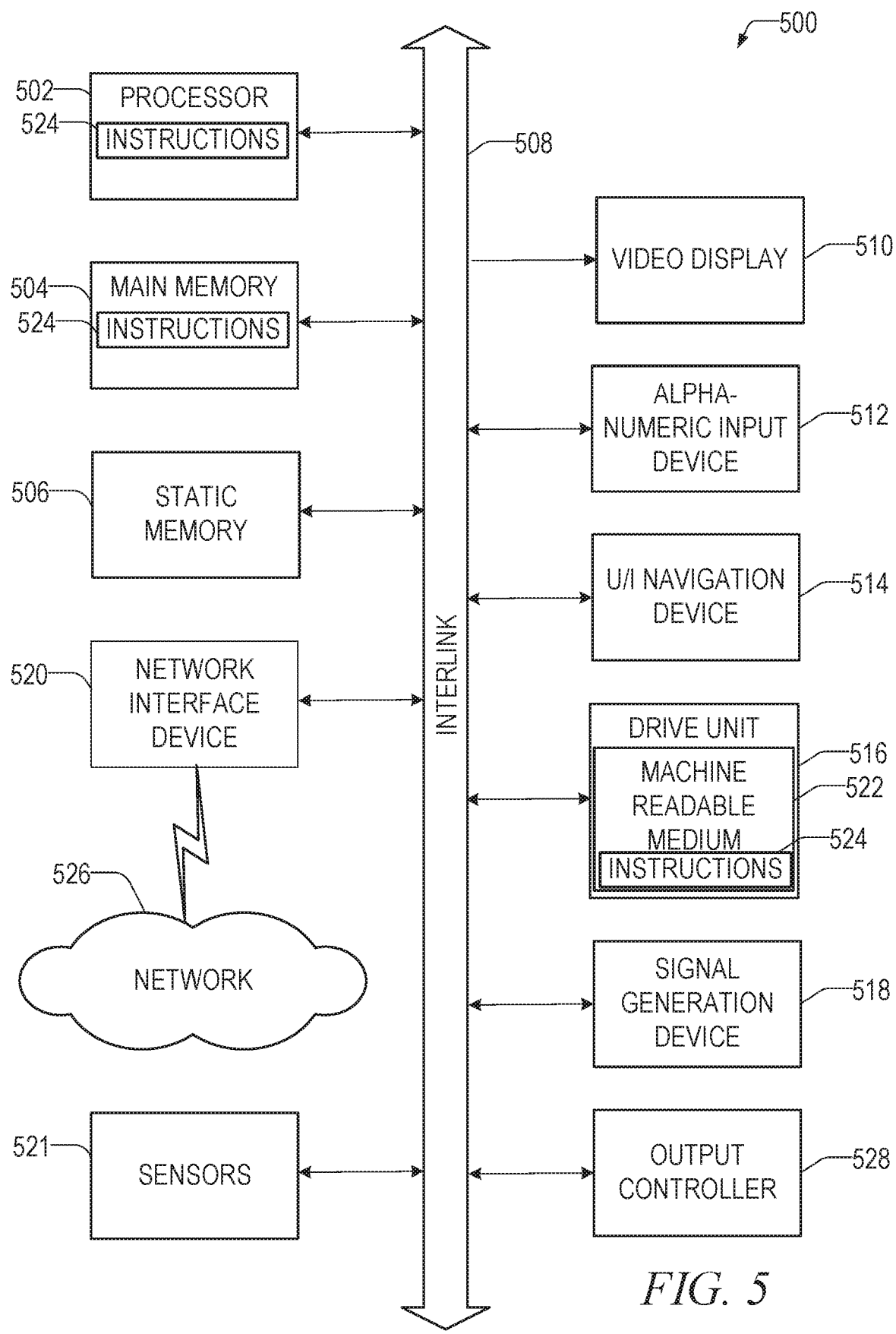
FIG. 5 is a block diagram illustrating a machine that may be a computer on which various processes described herein may be performed, in accordance with the disclosed subject matter.

FIG. 5 is a block diagram illustrating a machine that may be a computer on which various components described herein may reside and processes described herein may be performed. The machine (e.g., computer) 500 may include the local device/computer 138 and/or the global model computer 121. The machine 500 may include a hardware processor 502 (e.g., a central processing unit (CPU), which may be an implementation of the processor 522 discussed above, a graphics processing unit (GPU), a hardware processor core, or any combination thereof), a main memory 504 and a static memory 506, which may be an implementation of the memory 524 discussed above, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example described herein, the display unit 510, input device 512 and UI navigation device 514 may be a touch screen display. The machine 500 may additionally include a storage device 516 (e.g., drive unit), a signal generation device 518 (e.g., a speaker), a network interface device 520, and at least one of sensors 521, such as a global positioning system (GPS) sensor, compass, accelerometer, or other sensor. The machine 500 may include an output controller 528, such as a serial (e.g., universal serial bus (USB)), parallel, or other wired or wireless (e.g., infrared (IR), near field communication (NFC), etc.) controller connection to communicate or control at least one of peripheral devices (e.g., a printer, card reader, etc.).

The storage device 516 may include a machine readable medium 522 on which is stored at least one of sets of data structures or instructions 524 (e.g., software) embodying or utilized by at least one of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the at least one instruction 524.

The term "machine readable medium" may include any medium that is capable of storing, encoding, or carrying instructions for execution by the machine 500 and that cause the machine 500 to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over the communications network 526 using a transmission medium via the network interface device 520. The term "transmission medium" is defined herein to include any medium that is capable of storing, encoding, or carrying instructions for execution by the machine, and includes digital or analog communications signals or other medium to facilitate communication of such software.

The machine 500 may communicate with at least one of other machines 500 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 500. In an example, the network interface device 520 may include a physical jack (e.g., Ethernet, coaxial, or phone jacks) or an antenna to connect to the communications network 526.

In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

A wide variety of computing devices may constitute a machine 500, as described herein. The following list includes a variety of devices that may fit the definition of a machine 500: a personal data assistant (PDA), a cellular telephone, including a smartphone, a tablet computing device, a laptop computer, a desktop computer, a workstation, a server computer, a mainframe computer, and the like.

Figure 6:
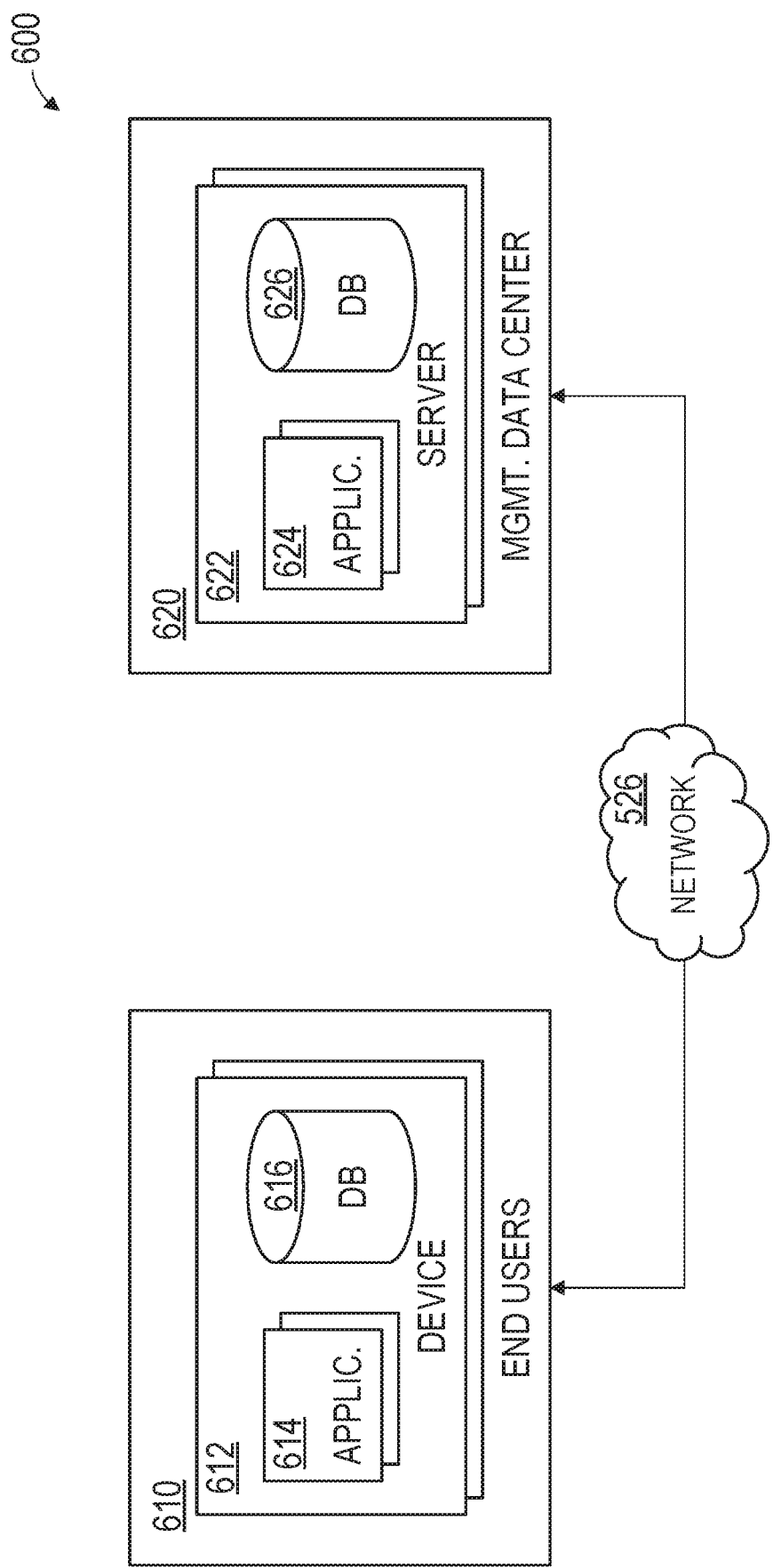
FIG. 6 is a block diagram of a network distributed system that may include a client-server architecture or cloud computing system, in accordance with the disclosed subject matter.

FIG. 6 is a block diagram of a network distributed system 600 that may include a client-server architecture or cloud computing system. Distributed system 600 may have at least one end user 610. An end user 610 may have various computing devices 612, which may be machines 600 as described above. The end-user computing devices 612 may comprise applications 614 that are either designed to execute in a stand-alone manner, or interact with other applications 614 located on the device 612 or accessible via the network 526. These devices 612 may also comprise a data store 616 that holds data locally, the data being potentially accessible by the local applications 614 or by remote applications.

The system 600 may also include at least one management data center 620. A data center 620 may be a server 622 or the like associated with a business entity that an end user 610 may interact with. The business entity may be a computer service provider, as may be the case for a cloud services provider, or it may be a consumer product or service provider, such as a retailer. The data center 620 may comprise at least one application 624 and database 626 that are designed to interface with the applications 614 and databases 616 of end-user devices 612. Data centers 620 may represent facilities in different geographic locations where the servers 622 may be located. Each of the servers 622 may be in the form of a machine(s) 600.

The end-user devices 612 and data center servers 622 may be configured to connect with each other via the network 526, and access to the network by machines may be made via a common connection point or different connection points, e.g. a wireless connection point and a wired connection. Any combination of common or different connections points may be present, and any combination of wired and wireless connection points may be present as well. The network 526, end users 610, and data centers 620 may include network hardware such as routers, switches, load balancers and/or other network devices.

Other implementations of the system 600 are also possible. For example, devices other than the client devices 612 and servers 622 shown may be included in the system 600. In an implementation, an additional server may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 622.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all aspects and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

EXAMPLES

Example 1 is a system for sensor-based person recognition, the system comprising: a data store including global data of a user, the global data including a globally unique identifier and sensed training data; a classifier to: identify the user at a first time using the global data; augment the global data with first context information of the user captured at the first time; and identify the user at a second time by finding correlations between second context information and the first context information when using the global data fails, the second context information of the user captured at the second time.

In Example 2, the subject matter of Example 1 optionally includes wherein the classifier, when it fails to identify the user at the first time using the global data, is to: create a unique identifier for the user and associate the first sensed cue data with the user; at the second time: collect and store the second context information of the user in a local model database; when the user is recognized from the global data by using the second context information, then: associate the second context information with user; when the user is recognized by comparing the second context information with the first context information, then associate the first context information with the user.

In Example 3, the subject matter of any one or more of Examples 1-2 optionally include wherein a recognition of a person includes assigning a confidence score that is associated with the recognition.

In Example 4, the subject matter of Example 3 optionally includes wherein the global data, first context information or second context data comprises an aspect having a proximity element that is location based or a time element that is a decay model.

In Example 5, the subject matter of Example 4 optionally includes wherein aspects having a small decay model value comprise at least one of clothing, personal items, or accessories and aspects having a large decay model value comprise at least one of face, hair, body parts, personal items birthmarks, or tattoos.

In Example 6, the subject matter of any one or more of Examples 4-5 optionally include wherein the global data, first context information, or second context information comprises an aspect having a uniqueness element.

In Example 7, the subject matter of any one or more of Examples 4-6 optionally include wherein a confidence level value is calculated to factor in the time element or the proximity element of an aspect contributing to the recognition.

In Example 8, the subject matter of any one or more of Examples 1-7 optionally include wherein the engagement zone is contiguous.

In Example 9, the subject matter of any one or more of Examples 1-8 optionally include wherein the recognition processor is one of a desktop, fixed location computer, portable computer, smart phone, tablet device, laptop, robotic device, augmented reality device, Internet of Things device, or a wearable device.

In Example 10, the subject matter of any one or more of Examples 1-9 optionally include wherein the global data, the first context information, and the second context information are shareable with networked devices over a network.

In Example 11, the subject matter of any one or more of Examples 1-10 optionally include wherein the stored sensed training data includes a frontal face view, voice, or body regions that may include hair, torso, and shoulder regions.

In Example 12, the subject matter of any one or more of Examples 1-11 optionally include wherein the processor is further to synchronize at least a part of the first context information with the global data.

In Example 13, the subject matter of any one or more of Examples 1-12 optionally include wherein the processor is further to synchronize at least a part of the first context information with the second context information.

In Example 14, the subject matter of any one or more of Examples 2-13 optionally include wherein the processor is further to synchronize at least a part of the first context information with the global data in the second time when the first context information was not synchronized with the global data in the first time.

Example 15 is a sensor-based person recognition system, comprising: an offline trainer, comprising: a training memory; and a training processor that, in an offline training phase, is to: store, in a global model database in the training memory, global data of a training person that comprises sensed training data and a globally unique identifier, a recognizer, comprising: a recognition memory; and a recognition processor that is to: in a first recognition phase, collect and store first sensed cue data of a first local person, in a local model database in the recognition memory, and, when the first local person is recognized as being the training person, then further associate first sensed cue data with the training person or the sensed training data; in a second recognition phase, collect second sensed cue data of a second local person, in the local model database, and when the second local person is not recognized as being the training person by comparing the sensed training data with the second sensed cue data, then recognize the second local person as being the training person by comparing the second sensed cue data with the first sensed cue data.

In Example 16, the subject matter of Example 15 optionally includes wherein: the globally unique identifier and the sensed training data comprise training data; the global model database memory is a part of a global model computer; the local model database memory is a part of a local model device; the sensed training data originates from a training input source; the sensed cue data originates from a local cue input source; the collecting of the sensed training data is performed in a training area; the collecting of the first sensed cue data is performed in an engagement zone; the training processor is to collect the sensed training data in a training area; the recognition processor is to collect the first sensed cue data in an engagement zone; in the first recognition phase, the first local person is recognized as being the training person by the recognition processor that is to compare the sensed training data with the first sensed cue data; in the second recognition phase, the second local person is recognized as being the training person by the recognition processor that is to compare the first sensed cue data with the second sensed cue data; and the second recognition phase occurs at a time later than the first recognition phase.

In Example 17, the subject matter of Example 16 optionally includes wherein the processor is to: in the first recognition phase: when the first local person is not recognized as being any training person in the global model database by comparing first sensed training data with first sensed cue data, then create a locally unique identifier for the first local person and associate the first sensed cue data with the first local person; in the second recognition phase: collect and store the second sensed cue data, of the second local person located in the engagement zone, in the local model database; when the second local person is recognized as being the training person by comparing the sensed training data with the second sensed cue data, then: associate the second sensed cue data with the training person or the global data; when the second local person is recognized as being the first local person by comparing the second sensed cue data with the first sensed cue data, then recognize the first local person as being the training person and associate the first sensed cue data with the training person or global data.

In Example 18, the subject matter of any one or more of Examples 16-17 optionally include wherein a recognition of a person includes assigning a confidence score that is associated with the recognition.

In Example 19, the subject matter of Example 18 optionally includes wherein the global data or sensed cue data comprises an aspect having a proximity element that is location based or a time element that is a decay model.

In Example 20, the subject matter of Example 19 optionally includes wherein aspects having a small decay model value comprise at least one of clothing, personal items, or accessories and aspects having a large decay model value comprise at least one of face, hair, body parts, personal items birthmarks, or tattoos.

In Example 21, the subject matter of any one or more of Examples 19-20 optionally include wherein the global data or sensed cue data comprises an aspect having a uniqueness element.

In Example 22, the subject matter of any one or more of Examples 19-21 optionally include wherein a confidence level value is calculated to factor in the time element or the proximity element of an aspect contributing to the recognition.

In Example 23, the subject matter of any one or more of Examples 16-22 optionally include wherein the engagement zone is contiguous.

In Example 24, the subject matter of any one or more of Examples 16-23 optionally include wherein the recognition processor is one of a desktop, fixed location computer, portable computer, smart phone, tablet device, laptop, robotic device, augmented reality device, Internet of Things device, or a wearable device.

In Example 25, the subject matter of any one or more of Examples 16-24 optionally include wherein the global data and the sense cue data are shareable with networked devices over a network.

In Example 26, the subject matter of any one or more of Examples 16-25 optionally include wherein the stored sensed training data includes a frontal face view, voice, or body regions that may include hair, torso, and shoulder regions.

In Example 27, the subject matter of any one or more of Examples 16-26 optionally include wherein the processor is further to synchronize at least a part of the first sensed cue data with the global data.

In Example 28, the subject matter of any one or more of Examples 16-27 optionally include wherein the processor is further to synchronize at least a part of the first sensed cue data with the second sensed cue data.

In Example 29, the subject matter of any one or more of Examples 16-28 optionally include wherein the training area and the engagement zone are physically separated areas.

In Example 30, the subject matter of any one or more of Examples 16-29 optionally include wherein the training input source is at least one of a video device, an audio device, or a wireless device detector.

In Example 31, the subject matter of any one or more of Examples 17-30 optionally include wherein the processor is further to synchronize at least a part of the first sensed cue data with the global data in the second recognition phase when the first sensed cue data was not synchronized with the global data in the first recognition phase.

Example 32 is a method for sensor-based person recognition, comprising: in an offline training phase, using a training processor for collecting and storing sensed training data and a globally unique identifier, collectively global data, of a training person in a global model database memory, in a first recognition phase, using a recognition processor for collecting and storing first sensed cue data of a first local person, in a local model database memory, and when the first local person is recognized as being the training person, then further associating first sensed cue data with the training person or the sensed training data; in a second recognition phase, collecting second sensed cue data of a second local person, in the local model database memory, and when the second local person is not recognized as being the training person by comparing the sensed training data with the second sensed cue data, then recognizing the second local person as being the training person by comparing the second sensed cue data with the first sensed cue data.

In Example 33, the subject matter of Example 32 optionally includes wherein: the globally unique identifier and the sensed training data comprise training data; the global model database memory is a part of a global model computer; the local model database memory is a part of a local model device; the sensed training data originates from a training input source; the sensed cue data originates from a local cue input source; the collecting of the sensed training data is performed in a training area; the collecting of the first sensed cue data is performed in an engagement zone; in the first recognition phase, the first local person is recognized as being the training person by comparing the sensed training data with the first sensed cue data; in the second recognition phase, the second local person is recognized as being the training person by comparing the first sensed cue data with the second sensed cue data; and the second recognition phase occurs at a time later than the first recognition phase.

In Example 34, the subject matter of Example 33 optionally includes in the first recognition phase: when the first local person is not recognized as being any training person in the global model database by comparing first sensed training data with first sensed cue data, then creating a locally unique identifier for the first local person and associating the first sensed cue data with the first local person; in the second recognition phase: collecting and storing the second sensed cue data, of the second local person located in the engagement zone, in the local model database; when the second local person is recognized as being the training person by comparing the sensed training data with the second sensed cue data, then when the second local person is recognized as being the first local person by comparing the second sensed cue data with the first sensed cue data, then recognizing the first local person as being the training person and associating the first sensed cue data with the training person.

In Example 35, the subject matter of Example 34 optionally includes assigning a confidence score that is associated with the recognition.

Example 36 is a computer program product comprising at least one computer readable storage media comprising computer-executable instructions operable to, when executed by processing circuitry of a device, configure the device to: in an offline training phase, use a training processor for collecting and storing sensed training data and a globally unique identifier, collectively global data, of a training person in a global model database memory; in a first recognition phase, use a recognition processor for collecting and storing first sensed cue data of a first local person, in a local model database memory, and when the first local person is recognized as being the training person, then further to associate first sensed cue data with the training person or the sensed training data; in a second recognition phase, collect second sensed cue data of a second local person, in the local model database memory, and when the second local person is not recognized as being the training person by comparing the sensed training data with the second sensed cue data, then to recognize the second local person as being the training person by comparing the second sensed cue data with the first sensed cue data.

In Example 37, the subject matter of Example 36 optionally includes wherein: the globally unique identifier and the sensed training data comprise training data; the global model database memory is a part of a global model computer; the local model database memory is a part of a local model device; the sensed training data originates from a training input source; the sensed cue data originates from a local cue input source; the collecting of the sensed training data is performed in a training area; the collecting of the first sensed cue data is performed in an engagement zone; in the first recognition phase, the first local person is recognized as being the training person by comparing the sensed training data with the first sensed cue data; in the second recognition phase, the second local person is recognized as being the training person by comparing the first sensed cue data with the second sensed cue data; and the second recognition phase occurs at a time later than the first recognition phase.

Example 38 is a computer program product comprising one or more computer readable storage media comprising computer-executable instructions operable to, when executed by processing circuitry of a device, configure the device to perform any of the methods of Examples 32-35.

Example 39 is a system comprising means to perform any of the methods of Examples 32-35.

Example 40 is an apparatus for sensor-based person recognition, comprising: means for, in an offline training phase, using a training processor for collecting and storing sensed training data and a globally unique identifier, collectively global data, of a training person in a global model database memory; means for, in a first recognition phase, using a recognition processor for collecting and storing first sensed cue data of a first local person, in a local model database memory, and when the first local person is recognized as being the training person, then further associating first sensed cue data with the training person or the sensed training data; means for, in a second recognition phase, collecting second sensed cue data of a second local person, in the local model database memory, and when the second local person is not recognized as being the training person by comparing the sensed training data with the second sensed cue data, then recognizing the second local person as being the training person by comparing the second sensed cue data with the first sensed cue data.

In Example 41, the subject matter of Example 40 optionally includes wherein: the globally unique identifier and the sensed training data comprise training data; the global model database memory is a part of a global model computer; the local model database memory is a part of a local model device; the sensed training data originates from a training input source; the sensed cue data originates from a local cue input source; the collecting of the sensed training data is performed in a training area; the collecting of the first sensed cue data is performed in an engagement zone; in the first recognition phase, the first local person is recognized as being the training person by comparing the sensed training data with the first sensed cue data; in the second recognition phase, the second local person is recognized as being the training person by comparing the first sensed cue data with the second sensed cue data; and the second recognition phase occurs at a time later than the first recognition phase.

In Example 42, the subject matter of Example 41 optionally includes means for, in the first recognition phase: when the first local person is not recognized as being any training person in the global model database by comparing first sensed training data with first sensed cue data, then creating a locally unique identifier for the first local person and associating the first sensed cue data with the first local person; means for, in the second recognition phase: collecting and storing the second sensed cue data, of the second local person located in the engagement zone, in the local model database; when the second local person is recognized as being the training person by comparing the sensed training data with the second sensed cue data, then when the second local person is recognized as being the first local person by comparing the second sensed cue data with the first sensed cue data, then recognizing the first local person as being the training person and associating the first sensed cue data with the training person.

Example 43 is at least one machine-readable medium including instructions, which when executed by a machine, cause the machine to perform operations of any of the operations of claims 1-42.

Example 44 is an apparatus comprising means for performing any of the operations of claims 1-42.

Example 45 is a system to perform the operations of any of the claims 1-42.

Example 46 is a method to perform the operations of any of the claims 1-42.

The invention claimed is:

1. A system for sensor-based person recognition, the system comprising:
   a processor;
   a global model database; and
   memory including instructions stored thereon which, when executed by the processor, cause the processor to:
      collect sensed training data;
      store the sensed training data as global data in the global model database;
      at a first time:
         collect first sensed cue data;
         attempt to identify the user at the first time by comparing the global data with the first sensed cue data; and
         when the attempt to identify the user at the first time fails, create a first locally unique identifier and associate the first locally unique identifier with the first sensed cue data;

at a second time:
  collect second sensed cue data; and
  attempt to identify the user at the second time by comparing the second sensed cue data with the global data and the first sensed cue data;
wherein, when the user is identified at the second time by comparing the global data with the second sensed cue data, associate the second sensed cue data with the global data and wherein when the user is identified at the second time by comparing the second sensed cue data with the first sensed cue data, associate the second sensed cue data with the first locally unique identifier.

2. The system of claim 1, wherein the global data, the first sensed cue data or second sensed cue data comprises an aspect having a proximity element that is location based or a time element that is a decay model.

3. The system of claim 2, wherein aspects having a small decay model value comprise at least one of clothing, personal items, or accessories and aspects having a large decay model value comprise at least one of face, hair, body parts, personal items birthmarks, or tattoos.

4. The system of claim 2, wherein the global data, first sensed cue data, or second sensed cue data comprises an aspect having a uniqueness element.

5. The system of claim 2, wherein a confidence level value is calculated to factor in the time element or the proximity element of an aspect contributing to the recognition.

6. The system of claim 1, wherein identification of a person occurs in an engagement zone, the engagement zone including a location where recognition is to take place, and wherein the engagement zone is contiguous.

7. The system of claim 1, wherein the processor is a component of one of a desktop, fixed location computer, portable computer, smart phone, tablet device, laptop, robotic device, augmented reality device, Internet of Things device, or a wearable device.

8. The system of claim 1, wherein the global data, the first sensed cue data, and the second sensed cue data are shareable with networked devices over a network.

9. The system of claim 1, wherein the stored sensed training data includes a frontal face view, voice, or body regions that may include hair, torso, and shoulder regions.

10. The system of claim 1, wherein the processor is further to synchronize at least a part of the first sensed cue data with the global data.

11. The system of claim 1, wherein the processor is further to synchronize at least a part of the first sensed cue data with the second sensed cue data.

12. The system of claim 1, wherein the processor is further to synchronize at least a part of the first sensed cue data with the global data in the second time when the first sensed cue data was not synchronized with the global data in the first time.

13. The system of claim 1, wherein an identification of the user includes the processor assigning a confidence score that is associated with identifying the user.

14. A sensor-based person recognition system, comprising:
  a processor;
  a global model database storing:
    sensed training data corresponding to a training person; and
  memory including instructions stored thereon, which when executed by the processor, cause the processor to:
    in a first recognition phase:
      collect and store first sensed cue data of a first local person in a local model database;
      compare the first sensed cue data with the sensed training data; and
      in response to comparing the first sensed cue data with the sensed training data, attempt to recognize the first local person as being the training person;
    in a second recognition phase:
      collect second sensed cue data of a second local person in the local model database;
      compare the second sensed cue data with the sensed training data and the first sensed cue data; and
      in response to comparing the second sensed cue data with the sensed training and the first sensed cue data, attempt to recognize the second local person as being the training person;
  wherein, when the first local person is recognized as being the training person, associate the first sensed cue data with the sensed training data;
  wherein, when the second local person is recognized as being the training person by comparing the second sensed cue data with the sensed training data, associate the second sensed cue data with the sensed training data;
  wherein, when the second local person is identified as the training person by comparing the second sensed cue data with the first sensed cue data, associate the second sensed cue data with the first sensed cue data and the sensed training data.

15. The system of claim 14, wherein:
a globally unique identifier and the sensed training data comprise training data;
the global model database is a part of a global model computer;
the local model database is a part of a local model device;
the sensed training data originates from a training input source;
the first and second sensed cue data originates from a local cue input source;
the collecting of the sensed training data is performed in a training area;
the collecting of the first sensed cue data is performed in a first engagement zone;
the collecting of the second sensed cue data is performed in a second engagement zone;
the processor is to collect the sensed training data in a training area;
the processor is to collect the first sensed cue data in the first engagement zone;
the processor is to collect the second sensed cue data in the second engagement zone; and
the second recognition phase occurs at a time later than the first recognition phase.

16. The system of claim 15, wherein the processor is to:
in the first recognition phase:
  when the first local person is not recognized as being any training person in the global model database by comparing the sensed training data with the first sensed cue data, then create a locally unique identifier for the first local person and associate the first sensed cue data with the first local person;
in the second recognition phase:
  collect and store the second sensed cue data, of the second local person located in the engagement zone, in the local model database;

when the second local person is recognized as being the training person by comparing the sensed training data with the second sensed cue data, then:
associate the second sensed cue data with the training person or the sensed training data;
when the second local person is recognized as being the first local person by comparing the second sensed cue data with the first sensed cue data, then:
recognize the first local person as being the training person and associate the first sensed cue data with the training person or the sensed training data.

17. The system of claim 15, wherein the stored sensed training data includes a frontal face view, voice, or body regions that may include hair, torso, and shoulder regions.

18. The system of claim 15, wherein the processor is further to synchronize at least a part of the first sensed cue data with the global data.

19. The system of claim 14, wherein a recognition of a person includes assigning a confidence score that is associated with the recognition.

20. A method for sensor-based person recognition, performed by a processor, the method comprising:
in an offline training phase:
collecting and storing global data of a training person in a global model database memory;
in a first recognition phase:
collecting and storing first sensed cue data of a first local person, in a local model database memory;
comparing the first sensed cue data with the global data; and
in response to comparing the first sensed cue data with the global data, attempting to recognize the first local person as being the training person;
in a second recognition phase:
collecting second sensed cue data of a second local person, in the local model database memory;
comparing the second sensed cue data with the global data and the first sensed cue data; and
in response to comparing the second sensed cue data with the global data and the first sensed cue data, attempting to recognize the second local person as being the training person;
wherein, when the first local person is recognized as being the training person by comparing the first sensed cue data with the global data, associating the first sensed cue data with the global data;
wherein, when the first local person is not recognized as being the training person by comparing the first sensed cue data with the global data, proceeding to the second recognition phase;
wherein, when the second local person is recognized as being the training person by comparing the second sensed cue data with the global data, associating the second sensed cue data with the global data;
wherein, when the second local person is not recognized as being the training person by comparing the second sensed cue data with the global data, comparing the second sensed cue data with the first sensed cue data; and
wherein, when the second local person is recognized as being the training person by comparing the second sensed cue data with the first sensed cue data, associating the second sensed cue data with the first sensed cue data and the global data.

21. The method of claim 20, wherein:
a globally unique identifier and the sensed training data comprise training data;
the global model database memory is a part of a global model computer;
the local model database memory is a part of a local model device;
the sensed training data originates from a training input source;
the first and second sensed cue data originates from a local cue input source;
the collecting of the sensed training data is performed in a training area;
the collecting of the first sensed cue data is performed in a first engagement zone;
the collecting of the second sensed cue data is performed in a second engagement zone; and
the second recognition phase occurs at a time later than the first recognition phase.

22. The method of claim 21, further comprising:
in the first recognition phase:
when the first local person is not recognized as being any training person in the global model database memory by comparing the global data with the first sensed cue data, then creating a locally unique identifier for the first local person and associating the first sensed cue data with the first local person;
in the second recognition phase:
collecting and storing the second sensed cue data, of the second local person located in the engagement zone, in the local model database memory;
when the second local person is recognized as being the training person by comparing the global data with the second sensed cue data, then when the second local person is recognized as being the first local person by comparing the second sensed cue data with the first sensed cue data, then recognizing the first local person as being the training person and associating the first sensed cue data with the training person.

23. The method of claim 20, wherein a recognition of a person includes assigning a confidence score that is associated with the recognition.

24. At least one non-transitory computer readable storage media comprising computer-executable instructions operable to, when executed by processing circuitry of a device, configure the device to:
in an offline training phase:
collect and store global data, of a training person in a global model database memory;
in a first recognition phase:
collect and store first sensed cue data of a first local person, in a local model database memory;
compare the first sensed cue data with the global data; and
in response to comparing the first sensed cue data with the global data, attempt to recognize the first local person as the training person;
in a second recognition phase:
collect second sensed cue data of a second local person, in the local model database memory,
compare the second sensed cue data with the global data and the first sensed cue data; and
in response to comparing the second sensed cue data with the global data and the first sensed cue data, attempt to recognize the second local person as the training person, wherein, when the first local person is recognized as being the training person by comparing the first sensed cue data with the global data, associate the first sensed cue data with the global data;

wherein, when the second local person is recognized as being the training person by comparing the second sensed cue data with the global data, associate the second sensed cue data with the global data;

wherein, when the second local person is recognized as being the training person by comparing the second sensed cue data with the first sensed cue data, associate the second sensed cue data with the first sensed cue data and the global data; and wherein a recognition of a person includes assigning a confidence score that is associated with the recognition.

25. The at least one non-transitory computer readable storage media of claim 24, wherein:

a globally unique identifier and the sensed training data comprise training data;

the global model database memory is a part of a global model computer;

the local model database memory is a part of a local model device;

the sensed training data originates from a training input source;

the first and second sensed cue data originates from a local cue input source;

the collecting of the sensed training data is performed in a training area;

the collecting of the first sensed cue data is performed in a first engagement zone;

the collecting of the second sensed cue data is performed in a second engagement zone.

* * * * *

UNITED STATES PATENT AND TRADEMARK OFFICE
CERTIFICATE OF CORRECTION

PATENT NO. : 10,671,840 B2  
APPLICATION NO. : 15/587194  
DATED : June 2, 2020  
INVENTOR(S) : Lacewell et al.

Page 1 of 1

It is certified that error appears in the above-identified patent and that said Letters Patent is hereby corrected as shown below:

On the Title Page

In item (54), in "Title" and in the Specification, in Column 1, Lines 1-3, delete "METHOD AND APPARATUS FOR PERSON RECOGNITION USING CONTINUOUS SELF-LEARNING" and insert --METHOD AND APPARATUS FOR PERSON RECOGNITION-- therefor Signed and Sealed this  
Twenty-ninth Day of December, 2020

Andrei Iancu  
*Director of the United States Patent and Trademark Office*